June 4, 1968  R. F. C. VESSOT  3,387,207
OPTICALLY TRANSPARENT CAVITY RESONATOR AND GASEOUS
ATOMIC RESONANCE APPARATUS USING SAME
Filed May 17, 1965  2 Sheets-Sheet 1
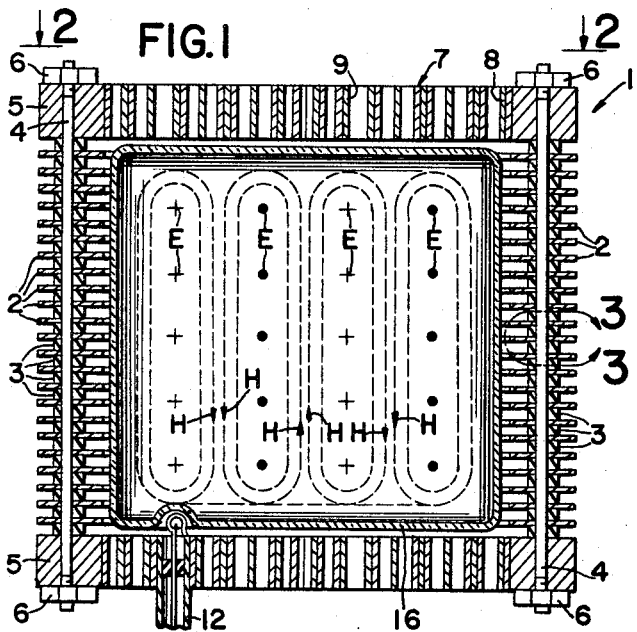
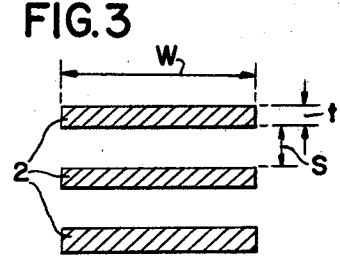
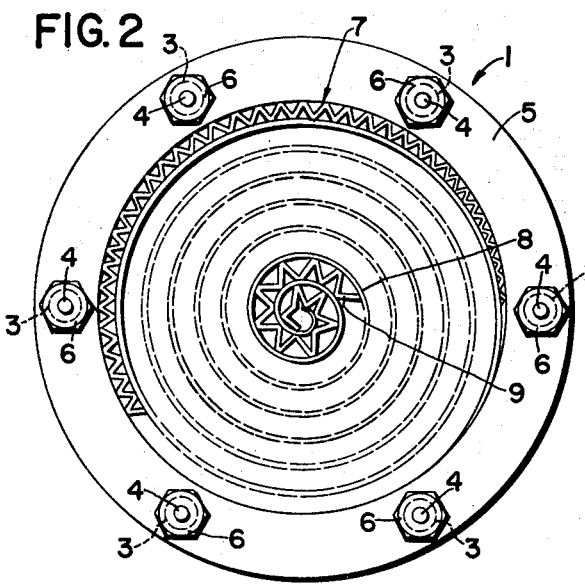
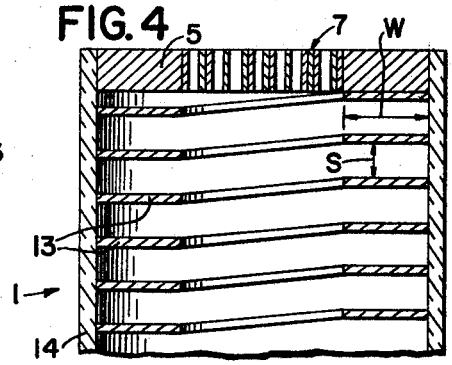
INVENTOR.
ROBERT F.C. VESSOT
BY *Harry E. Aine*
ATTORNEY June 4, 1968  R. F. C. VESSOT  3,387,207
OPTICALLY TRANSPARENT CAVITY RESONATOR AND GASEOUS
ATOMIC RESONANCE APPARATUS USING SAME
Filed May 17, 1965  2 Sheets-Sheet 2

INVENTOR.
ROBERT F.C. VESSOT
BY *Harry E. Aine*

ATTORNEY

United States Patent Office 3,387,207
Patented June 4, 1968

3,387,207
OPTICALLY TRANSPARENT CAVITY RESONATOR AND GASEOUS ATOMIC RESONANCE APPARATUS USING SAME
Robert F. C. Vessot, Marblehead, Mass., assignor to Varian Associates, Palo Alto, Calif., a corporation of California
Filed May 17, 1965, Ser. No. 456,267
12 Claims. (Cl. 324—.5)

ABSTRACT OF THE DISCLOSURE

A high Q optically transparent cavity resonator structure is disclosed. A light transmissive side wall portion of the cavity is formed by a plurality of conductive ring portions axially spaced apart to define light transmissive portions between adjacent ones of the rings. The ring portions are made of a conductive material having a thickness less than twice the spacing between adjacent rings and a radial width greater than twice the axial spacing between adjacent portions. By causing the ring portions to have a thickness less than twice the spacing between adjacent ring portions a light transparency for the cavity of at least 30% is assured. By causing the radial width of the conductive rings to be greater than twice the axial spacing between adjacent rings the radiation loss of R.F. energy through the light transparent side wall is minimized. The high Q light transparent cavity is especially useful in an optically pumped rubidium maser wherein a source of optical pumping radiation is disposed outside the cavity for applying optical pumping radiation to an ensemble of rubidium atoms inside the cavity. In a preferred embodiment, a light reflector surrounds the cavity for illuminating the cavity from all sides and a light pumping filter cell is provided by a gas fill between the cavity and the reflector and light source. In one embodiment of the light transparent cavity, the ring portions of the cavity structure are formed by a helically wound continuous metallic ribbon.

Heretofore gaseous vapor optically pumped maser oscillator frequency standards have been produced such as, for example, that described and claimed in U.S. application Ser. No. 401,731, filed Oct. 5, 1964, and assigned to the same assignee as the present invention. Such prior maser oscillators have had a signal power output of on the order of $10^{-11}$ watts utilizing a cylindrical circular electric mode cavity having optical pumping light entering the cavity from one or both perforated end walls thereof.

In the present invention it has been found that the signal to noise ratio of the resonance signal obtained from the ensemble of resonant gaseous atoms can be substantially enhanced by forming the cavity side walls of a plurality of spaced conductive rings to form a high Q highly transparent cavity. With such an improved cavity resonator the signal to noise ratio of the maser oscillator or frequency standard is made better by a factor of on the order of 100 times.

The principal object of the present invention is the provision of an improved optically transparent cavity resonator and atomic resonance frequency standards or maser oscillators using same.

One feature of the present invention is the provision of a circular electric mode cavity resonator having its side walls formed by a plurality of spaced ring portions with the thickness of the ring portions less than twice the spacing between adjacent ring portions and the width of the ring portions being greater than twice the spacing between adjacent ring portions whereby a high Q cavity is formed with greater than 30% optical transparency through the side walls thereof.

Another feature of the present invention is the provision of a cavity resonator according to the preceding feature wherein an end wall of the cavity resonator is formed of an array of concentrically disposed ones of said ring member portions whereby said end wall is made optically transparent.

Another feature of the present invention is the provision of an optically pumped maser oscillator utilizing one or more of the preceding features whereby improved signal to noise ratio is obtained for the maser oscillator.

Another feature of the present invention is the same as the preceding feature including the provision of a surrounding pumping light reflecting means for illuminating the interior of the cavity resonator from opposite sides thereof through its transparent side wall portions Another feature of the present invention is the same as one or more of the preceding features wherein the cavity resonator is surrounded by a coaxial filter gas cell.

Figure 5:
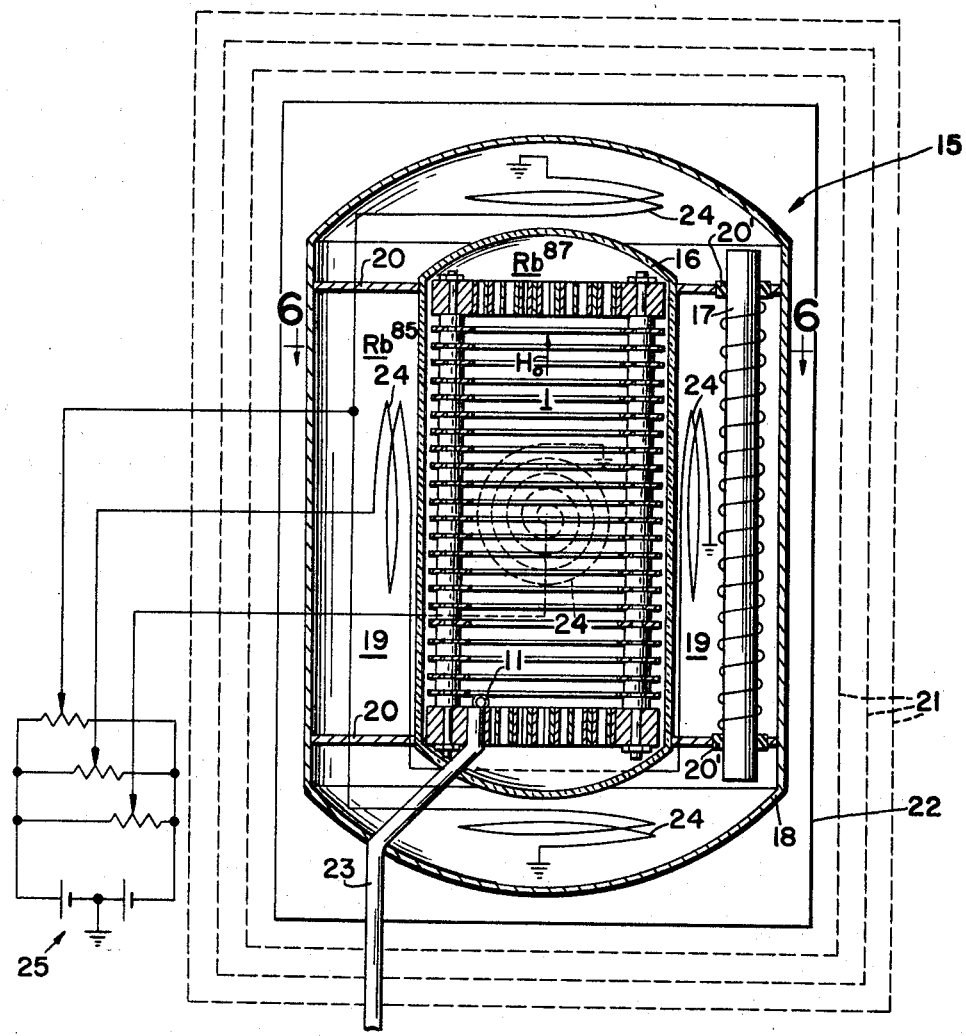
Figure 6:
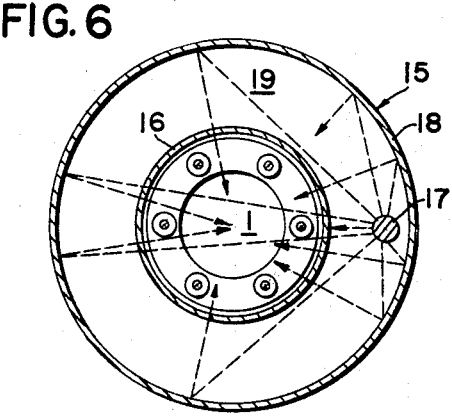

Other features and advantages of the present invention will become apparent upon a perusal of the following specification taken in connection with the accompanying drawings wherein:

FIG. 1 is a longitudinal sectional view of a cavity resonator incorporating features of the present invention, FIG. 2 is a transverse sectional view of a portion of the structure of FIG. 1 taken along line 2—2 in the direction of the arrows, FIG. 3 is an enlarged fragmentary view of a portion of the structure of FIG. 1 delineated by line 3—3, FIG. 4 is a fragmentary longitudinal sectional view of an alternative cavity construction incorporating features of the present invention, FIG. 5 is a longitudinal sectional view of a maser oscillator incorporating features of the present invention, and FIG. 6 is a reduced transverse sectional view of the structure of FIG. 5 taken along line 6—6 thereof in the direction of the arrows.

Referring now to FIGS. 1–3 there will first be described the novel optically transparent high Q cavity resonator of the present invention. Then it will be described how this novel cavity feature may be advantageously employed with other novel features to obtain an improved atomic resonance apparatus useful as an improved frequency standard or magnetometer.

A cavity resonator 1 is formed by a plurality of conductive ring members 2 as of copper stacked one above the other in spaced apart relation. The rings 2 are preferably spaced apart by means of dielectric ring like washers 3 as of quartz or alumina ceramic. The rings 2 are perforated at a plurality of points as of 6 at equal spacings about the periphery of the ring to receive a plurality of tie rods 4 onto which the rings 2 and spacers 3 are alternatively stacked. A pair of relatively thick walled ring members 5 are positioned at opposite ends of the stack of rings 2. The stack of rings is tightly drawn together to form a rigid hollow structure by means of nuts 6 tightened down over threaded ends of the tie rods 4. The ends of the cavity resonator 1 are closed to R.F. by means of a pair of transparent end walls 7 formed by a spirally wound conductive ribbon 8 as of copper wound over a similar ribbon member 9 which has been previously transversely corrugated. The composite spiral structure formed thereby is framed by the heavy ring member 5 and dip brazed to form a rigid highly transparent end wall structure.

The cavity 1 is advantageously dimensioned to resonate on a higher order $TE_{0, n, m}$ mode at the frequency of interest, such as for example the $TE_{0, 2, 1}$ mode depicted by the field pattern of FIG. 1. Other higher order $TE_{0,n,m}$ modes would include the $TE_{0,1,m}$ modes, where $m$ is greater than three. These higher order modes have higher Q and readily permit thorough illumination of a gas within the cavity when illumination is provided through the transparent side walls of the cavity 1 rather than through the end walls, as previously proposed.

An output R.F. coupling means such as conductive loop 11 is positioned to couple to the R.F. magnetic fields of the cavity resonator for coupling out R.F. energy to a suitable load via a suitable transmission line such as a coaxial line 12.

The cavity 1 may be tuned by conventional volume displacing elements, not shown. However in a preferred embodiment the cavity is tuned electronically by directionally coupling, by means of a 10 db directional coupler, a length of coaxial line to the output line 12 near the cavity 1. The coupled length of coaxial line includes a center conductor connector to a shorted end of the coaxial line by means of a diode. A variable voltage across the diode serves to vary the conductance of the center conductor as connected to the short from an open circuit condition to a short circuit condition. In this manner the reactive impedance of this shorted length of coupled line as reflected into the cavity 1 is changed to vary the resonant frequency of the cavity 1. This type of tuner permits rapid cavity tuning without movable elements translatable through various gas tight envelopes.

The novel cavity 1 of FIGS. 1–3 is characterized by the provision of conductive ring portions of relatively large width $w$, see FIG. 3, compared to the spacing, $s$, between adjacent ring portions 2. The cut off wavelength $\lambda_c$ for the radial transmission line formed by the space between adjacent rings 2 for the circular electric mode is proportional to twice the spacing between rings. Of course the cavity is dimensioned to operate at a dominant resonant frequency much below the frequency for which a wavelength is near twice the spacing $s$ between rings. In addition the leakage L of R.F. energy at a given frequency out of the cavity 1 via these radial transmission line segments conforms to the relationship:

$$L \sim \frac{1}{e^{\frac{kw}{2s}}} \quad (1)$$

where $k$ is a constant, $w$ is the width of the rings 2 and $s$ is the spacing between adjacent rings. Thus from relation (1) above it is seen that the leakage of R.F. energy is reduced and thus the Q of the cavity is increased when the width, $w$, of the rings is greater than twice the spacing, $s$, between rings. This relationship of $w \geq 2s$ is a dominant feature of the cavity of the present invention.

Moreover, the transparency T of the side walls of the cavity 1 is essentially defined by:

$$T = \frac{s}{s+t} \quad (2)$$

where $t$ is the thickness of the rings 2 and $s$ is the spacing between adjacent rings. In order to meet the requirements of high transparency it is considered a characteristic of the cavity of the present invention that T be at least 0.333 and thus $s$ is equal to or greater than $0.5t$. In a typical cavity 1 of the present invention, the rings 2 have a width, $w$, of $5s$ and a thickness $t$ of $s/4$. Such a cavity side wall has 80% transparency and a Q for the entire cavity 1, when operated in the $TE_{0,2,1}$ mode, of 15,000. Higher cavity Q's are obtainable by dimensioning the cavity 1 for operation on higher order $TE_{0,n,m}$ modes such as the $TE_{0,n,m}$ where $n$ is 1 or more and $m$ is 4 or more. There are some advantages to a $TE_{0,1,m}$ mode cavity 1 when illumination of the gas filled interior of the cavity 1 is provided through the transparent side wall since the transverse dimension of the cavity is least for this mode and thus the central gas filled region of the cavity is least shadowed by absorption of illumination by the gas in the outermost radial regions of the cavity 1.

Referring now to FIG. 4 there is shown an alternative circular electric, $TE_{0,n,m}$ mode cavity construction. In this cavity 1 the side walls are formed by a single helically wound ribbon 13 as of copper which is preferably rigidly held together by being gripped as by shrink fitting or otherwise affixed as by glass frit about its exterior or interior to or by a transparent dielectric tube 14 as of quartz or glass. A conveneint way of making the helix 13 is to make a helical cut in a thick wall metallic tube, the pitch of the cut being equal to the thickness $t$ of the ribbon. The resulting helix 13 is then stretched axially to provide the requisite pitch to satisfy the side wall transparency T requirement of 0.333 as T is defined by Equation 2 above.

In addition, the ribbon 13 has a width $w \geq 2s$ where $s$ is the axial spacing between adjacent turns of the helical side wall structure. The end turn of the helix is brazed to the heavy ring 5 of the cavity end wall, previously described. When the cylinder 14 is of quartz the cavity will have a small thermal detuning coefficient. As used herein "ring" or "ring portion" is defined to mean a current carrying closed loop circuit of at least one turn and includes within its meaning either one turn of a helix or one turn of a closed ring circuit.

Referring now to FIGS. 5 and 6 there is shown a novel atomic resonance maser oscillator useful as for example a frequency standard or magnetometer and employing the aforementioned cavity 1 to obtain an enhanced signal to noise ratio. More specifically a rubidium maser 15 is shown and it includes a ring type cavity resonator 1, previously described above, dimensioned for operation on a desired $TE_{0,n,m}$ mode and has deposited therein approximately 4 mg. of pure $Rb^{87}$ metal a troom temperature. The cavity 1 is filled with a suitable buffer gas, such as pure nitrogen gas at a pressure of prefrably about 11 torr at room temperature. Nitrogen at 11 torr, as a buffer, has special advantage in producing maser gain which is more fully described in copending application U.S. Ser. No. 401,731 filed Oct. 5, 1964, and assigned to the same assignee as the present invention.

In operation, the cavity 1 is heated to about 60° C. at which temperature the $Rb^{87}$ metal vaporizes and thoroughly mixes with the buffer gas. A cylindrical gas envelope 16 as of glass envelops the cavity 1 whereby the cavity 1 also serves as the gas cell.

A $Rb^{87}$ lamp 17, such as, for example an elongated Varian X-49-609 model lamp, is disposed along the side of the cavity 1 and excited from a suitable R.F. power source, not shown, driving an exciting coil wound around the lamp. A cylindrical mirror reflector 18 having concave reflector end portions envelops the lamp 17 and cavity 1 for reflecting light emitted from the lamp 17 into the cavity 1 through the transparent side and end wall portions thereof. The region of space between the reflector 18 and the gas cell envelope 16 is filled with $Rb^{85}$ gas to form a filter 29 for filtering out certain undesired spectral lines of the $Rb^{87}$ lamp in order to permit optical pumping of the $Rb^{87}$ atoms within the cavity 1. This optical pumping depopulates the $F=1$ sublevel of the ground state of the $Rb^{87}$ atoms by exciting transitions of the $Rb^{87}$ atom to higher excited energy states from which the atoms decay with equal probability to the $F=1$ and $F=2$ levels of the ground states, but since the $F=1$ ground state level is continuously being depopulated by the optical pumping there results an overpopulation of the $F=2$ level of the ground state from which stimulated coherent emission of radiation may be obtained.

When a metallic structure such as the civity 1 or reflector 18 also serves as a part of the interior of an Rb gas cell, such as the filter 19 or gas cell 16, then the metal of these parts must not be reactive with Rb. It has been found that suitable non-reactive metals are nonmagnetic stainless steel, copper, and aluminum. Copper plated stainless steel would offer good strength and electrical conductivity for the rings 2 or helix 13 while polished stainless steel would be suitable for the reflector 18.

The cell 16 and lamp 17 are conveniently mounted within the cylindrical reflector by means of circular disk-like headers 20 as of stainless steel transversely mounted of the cylindrical reflector and apertured to receive the gas cell 16 and lamp 17, respectively. The lamp is preferably held by a dielectric bushing 20' to prevent shorting of the R.F. fields of the lamp exciting coil by the header 20.

A plurality of magnetic shields 21, as of, for example, Moly Permalloy closed cylinders envelop the cavity 1 to reduce the magnitude of extraneously produced magnetic fields. In addition, an oven 22 is provided internally of the shields 21 to maintain the various elements of the apparatus, including the gas cell, at a preferred operating temperature, as of, for example, 60° C.

A microwave output terminal 23 is formed by the coaxial line 12 coupled to the $TE_{o,n,m}$ mode of the cavity 1 via loop 11. Three quadraturely disposed, i.e., along the $x$, $y$ and $z$ axes, aiding connected Helmholtz coil pairs, schematically shown at 24, surround the cavity 1 and are each excited from an individually adjustable D.C. current source 25. The coil pairs 24 serve to control the residual D.C. magnetic field over the ensemble of gaseous atoms within the cavity 1 to any desired direction and magnitude. Preferably the coils 13 are adjusted to provide a small uniform polarizing magnetic field $H_o$, as of 1 milligauss, directed axially of the cavity 1.

In operation, the $Rb^{87}$ lamp 17 and filter 19 forms a source of optical radiation which serves to overpopulate the $F=2$ hyperfine sublevel of the ground state of the $Rb^{87}$ atoms forming the atomic resonance ensemble within the cavity 1. The cavity resonator 1 is tuned to the ground state $(F=2, M=0 \rightarrow F=1, M=0)$, hyperfine transition frequency of approximately 6,835 mc. With optimum adjustment of the coils 24, pumping light intensity, tuning of the cavity, and temperatures of the filter 19 and cavity 1, the gain of the atomic resonance ensemble is greater than 1 such that random microwave transitions from the $F=2$ hyperfine energy state to the $F=1$ hyperfine energy state within the cavity 1 excite the cavity resonator in such a way that the fields of the civity interact back on the ensemble of gaseous atoms to produce coherent self-sustaining continuous emission of radiation therefrom at the hyperfine resonance frequency. A portion of the microwave resonance signal is then coupled out of the cavity 1 via the output terminal 23 and fed to a suitable utilization device.

As a maser oscillator operating on a field independent transition, the apparatus of FIG. 5 provides an extremely simple secondary frequency standard with unprecedented possible short term stability of one part $10^{14}$. In addition, the maser oscillator will provide long term stability on the order of one part of $10^{12}$.

The maser oscillator of FIG. 5 may be operated in more than one substantially field independent mode of operation. In a preferred mode of operation, stimulated emission of radiation is obtained from a pure hyperfine transition, that is the Zeeman sublevels are separated in frequency away from the desired $(F=2, m=0 \rightarrow F=1, m=0)$ transition such that substantially only the desired field independent transition is observed. Generally, this separation of the Zeeman sublevels is obtained if the ensemble of $Rb^{87}$ atoms is immersed in a polarizing magnetic field $H_0$ of greater than 100 microgauss. However, in this mode of operation, the field dependent hyperfine transitions do not contribute to the field independent hyperfine transition and therefore the gain of the ensemble of gaseous atoms is less than that obtained if the field $H_0$ is reduced to less than 100 microgauss. Other parameters determining the maser conditions must be enhanced to obtain the maser oscillation. More specifically, the temperature of the ensemble should be optimized to improve the gain and the cavity Q can be increased by going to a larger volume cavity 1 operating in one of the higher smoke-ring modes to thereby enhance the maser conditions.

The second substantially field independent mode of operation of the maser oscillator of FIG. 5 is one in which the shields 21 and coils 24 serve to reduce the magnetic field over the ensemble of gaseous atoms within the cavity 1 to less than 100 microgauss such that the Zeeman sublevels combine with the desired $(F=2, m=0 \rightarrow F=1, m=0)$ transition, thereby increasing the gain of the ensemble. This combination of the Zeeman sublevels, while tending to increase the gain of the total ensemble, broadens the resonance line and tends to make the output subject to fluctuations in the magnetic environment. Thus, for the purposes of a frequency standard or atomic clock, the first above-mentioned high field independent mode of operation is preferred.

The advantage of the atomic gas resonant aparatus according to FIGS. 5 and 6 is that by surrounding the cavity 1 by a light reflector a maximum utilization of the available pumping light is obtained. In addition more intense illumination and hence more pumping is obtained for larger volumes of atomic gas by permitting the lamp 17 to extend along the side 7 of the cavity resonator 1 with the light being focused through the highly transparent side walls by the surrounding reflector 18 radially into the interior of the cavity and gas cell. Moreover the enclosing reflector permits the reflector 18 to serve the dual function of pumping light reflector and outer gas envelope wall for the filter 19.

Also, as an alternative to the cylindrical reflector 18, the reflector 18 and cavity 1 may be spherical but in a preferred embodiment the reflector 18 and cavity are cylindrical. Also as an alternative the gas cell envelope 16 may be disposed inside the cavity 1 and may include a separate filter 19 envelope, as of glass surrounding the cavity 1.

The atomic resonance tube apparatus, previously described, is not limited to $Rb^{87}$ atoms alone. Certain other isotopes of other metals such as, for example, thallium, sodium, potassium and cesium may be used. Any electron re-orientation transition or resonance in atoms or molecules for which the net atoms or molecules angular momentum, $f$, is an integer in quantum units of Planks' constant, $h$, may be used, such as for example atomic hydrogen. In general, it is contemplated any suitable molecular or atomic beam or assemblage having desired resonance characteristic may be used. The terms "atom" or "atomic particle" as used herein is defined to mean molecules as well as atoms.

Moreover the maser oscillator need not oscillate on a field independent quantum transition or resonance but may operate upon a field dependent transition in which case the maser oscillator frequency is a measure of the magnetic field intensity, and therefore is a magnetometer.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. An atomic resonance apparatus including, means forming a cavity resonator for containing therewithin an ensemble of atomic resonant bodies, said cavity resonator means being tuned to the resonant frequency of said atomic resonant bodies, means for illuminating the interior of said cavity resonator with optical radiation passing through light transmissive side wall portions of said cavity resonator, said light transmissive side wall portions of said cavity resonator being formed of plural conductive ring portions axially spaced apart to define the light transmissive portion of said cavity by the spaces between adjacent ones of said ring portions, said ring portions having a thickness less than twice the spacing between adjacent ring portions, and said ring portions having a radial width greater than twice the axial spacing between said adjacent ring portions, whereby a high Q highly light transparent cavity resonator is obtained for the atomic resonance apparatus.

2. The apparatus according to claim 1 including solid dielectric means fixedly holding apart adjacent ring portions of said cavity resonator.

3. The apparatus according to claim 1 wherein said plural ring portions are formed by a helically wound continuous metallic ribbon, said ribbon being wound with its wide sides generally perpendicular to the axis of said cavity resonator.

4. The apparatus according to claim 3 including means forming a light transparent dielectric cylinder coaxially disposed in abutting relation to said helical ribbon and rigidly holding said ribbon in fixed relative position.

5. The apparatus according to claim 4 wherein said dielectric cylinder means is closed at both ends to form a gas tight envelope for retaining the ensemble of atomic resonant bodies within said cavity resonator.

6. The apparatus according to claim 1 including means forming a lamp for supplying the optical radiation for illumination of the interior of said cavity, and means forming a reflector surrounding said lamp means and said cavity means for focusing optical radiation from said lamp means into said cavity resonator means.

7. The apparatus according to claim 6 wherein said ensemble of atomic resonant bodies is gaseous atoms and including, a dielectric light transparent gas tight envelope surrounding said ensemble of gaseous atoms and partitioning same from the interior region of said reflector which includes said lamp means, and means forming an optical filter disposed surrounding said partitioning envelope and between said reflector means and said envelope for filtering out certain optical spectral lines from said lamp radiation which would otherwise pass into said cavity resonator.

8. The apparatus according to claim 7 wherein said ensemble of gaseous atoms is $Rb^{87}$ atoms, said lamp is an $Rb^{87}$ lamp means, and said filter means is a gaseous sheath of $Rb^{85}$ atoms around said cavity resonator.

9. An atomic resonance apparatus including, means forming an ensemble of gaseous atoms, means forming a cavity resonator surrounding said ensemble of gaseous atoms, said cavity resonator being dimensioned to support a circular electric mode of resonance at the atomic resonance frequency of said ensemble of gaseous atoms for sustaining resonance of said ensemble of gaseous atoms, said cavity resonator having a cylindrical side wall and a pair of end closing walls closing off the ends of said cylindrical side wall, said side wall being formed by an array of coaxially aligned conductor ring portions with the axial spacing between adjacent ring portions being greater than one half the axial thickness of adjacent conductive ring portions, and the radial width of said ring portions being greater than twice the axial spacing between adjacent ring portions, and means for illuminating said ensemble of gaseous atoms with optical radiation passing into said cavity through the spaces between adjacent ring portions.

10. The apparatus according to claim 9 wherein said cavity is dimensioned to support a $TE_{o,n,m}$ mode where $n$ is at least 1 and $m$ is at least 4.

11. The apparatus according to claim 9 wherein said means for illuminating said ensemble includes an optical reflector surrounding said cavity resonator, and a lamp for producing the optical radiation being disposed in the space in between said cavity and said surrounding reflector.

12. The apparatus according to claim 11 including a filter for filtering out certain undesired spectral lines of said illumination produced by said lamp, and said filter forming a sheath surrounding said cavity and being disposed in the space between said cavity and said surrounding reflector.

References Cited

UNITED STATES PATENTS

| | | | |
|---|---|---|---|
| 2,884,524 | 4/1959 | Dicke | 330—4 |
| 3,165,705 | 1/1965 | Dicke | 324—0.5 |
| 3,205,432 | 9/1965 | Cochran | 324—0.5 |
| 3,214,684 | 10/1965 | Everitt | 324—0.5 |

RUDOLPH V. ROLINEC, *Primary Examiner.*

M. J. LYNCH, *Assistant Examiner.*